(12) United States Patent
Odhner et al.

(10) Patent No.: US 6,621,607 B1
(45) Date of Patent: Sep. 16, 2003

(54) DIFFRACTIVE DISPLAY

(75) Inventors: Jefferson E. Odhner, Amherst, NH (US); Donald L. Cullen, Columbus, OH (US); Ken G. Wasson, Foster City, CA (US); James E. Dvorsky, Hilliard, OH (US)

(73) Assignee: Luckoff Display Corporation, Columbus, OH (US)

( * ) Notice: Subject to any disclaimer, the term of this patent is extended or adjusted under 35 U.S.C. 154(b) by 29 days.

(21) Appl. No.: 09/663,850

(22) Filed: Sep. 18, 2000

Related U.S. Application Data (63) Continuation-in-part of application No. 09/372,315, filed on Aug. 11, 1999, now abandoned.

(51) Int. Cl.⁷ ................................................. G02B 5/32
(52) U.S. Cl. ............................ 359/18; 15/567; 15/569; 15/615; 15/17
(58) Field of Search ................................. 359/567, 569, 359/572, 1, 15, 18, 615

(56) References Cited

U.S. PATENT DOCUMENTS

| | | |
|---|---|---|
| 734,133 A | 7/1903 | Porter |
| 3,619,033 A | * 11/1971 | McMahon .................. 359/565 |
| 3,822,930 A | 7/1974 | Douklias |
| 4,706,173 A | 11/1987 | Hamada et al. |
| 4,765,724 A | 8/1988 | Huichun |
| 4,798,448 A | 1/1989 | van Raalte |
| 4,848,863 A | 7/1989 | Kramer |
| 5,046,794 A | 9/1991 | Ritter et al. |
| 5,161,042 A | 11/1992 | Hamada |
| 5,162,929 A | 11/1992 | Roddy et al. |
| 5,224,830 A | 7/1993 | Wang |
| 5,526,149 A | 6/1996 | Kanbe et al. |
| 5,613,022 A | 3/1997 | Odhner et al. |
| 5,633,737 A | 5/1997 | Tanaka et al. |
| 5,689,321 A | 11/1997 | Kochi |
| 5,825,443 A | 10/1998 | Kawasaki et al. |

FOREIGN PATENT DOCUMENTS

| | | |
|---|---|---|
| DE | 36 38 541 | 6/1987 |
| JP | 7-140918 A | 6/1995 |

OTHER PUBLICATIONS

Smith, Yasseen, Mehregany, and Merat. "Mocromotor grating optical switch." Optics Letters (1995) vol. 20, No. 16, pp. 1734–1736.

* cited by examiner

Primary Examiner—John Juba
Assistant Examiner—Leo Boutsikaris
(74) Attorney, Agent, or Firm—Mueller and Smith, LPA (57) ABSTRACT

The present invention is directed to an improvement in a diffractive display suitable for presenting graphic and the like displays. Broadly, a novel embodiment is realized from a holographic diffraction pattern carried by a magnet or element and an electrically energizable coil magnetically coupled with said magnet that is energizable for movement of the magnet. Rotation of the holographic diffraction pattern generates a display using the diffracted light from the holographic diffraction grating. Another novel embodiment is realized from a faceted rotatable element (FRE) having an array of facets each bearing a diffraction grating and a source energizable for rotation of the FRE from a resting station to a viewing station. Rotation of the FRE generates a display using the diffracted light from the diffraction gratings.

14 Claims, 7 Drawing Sheets

DIFFRACTIVE DISPLAY

CROSS-REFERENCE TO RELATED APPLICATIONS

This application is a continuation-in-part of application Ser. No. 09/372,315, filed Aug. 11, 1999; now abandoned and is cross-referenced to commonly-assigned application Ser. No. 09/836,685, filed Apr. 17, 2001, which is a continuation-in-part of Ser. No. 09/372,316, filed Aug. 11, 1999.

BACKGROUND OF THE INVENTION

The present invention relates to an improvement to a diffractive display (reflective or transmissive) wherein each pixel exhibits a full range of diffracted wavelengths (e.g., full range of colors) by a novel diffractive technique.

The art is replete in proposing graphics displays which utilize, for example, bimorph elements or, simply, bimorphs, or equivalents. A bimorph is a device manufactured with two strips of piezoelectric film which are fastened together and which have electrodes allowing electrical fields of the proper polarity to be applied to the film to cause an electrostrictive effect to occur. Such electrostrictive effect can be an in-plane elongation or contraction, or an out-of-plane deflection of one end of the film when the opposite end is secured.

U.S. Pat. No. 4,331,972 proposes a light valve comprising a pair of elements of transparent material, each comprising a diffraction grating of light periodicity facing each other with parallel grating lines. Such light valve is termed a bigrate in this patent. The transmission of light through the bigrate will depend on the relative position of the pair of gratings in the direction perpendicular to the grating lines. One of the gratings may be embossed on a bimorph film of polyvinylidene fluoride and moved by the application of a voltage thereto. One strip, then, may be moved relative to the other in response to an electrical signal to control the zero diffraction or the light transmission from no transmission to full transmission, or any desired intermediate transmission. Three different superimposed bigrated light valves are used for achieving the three different colors required for a color display, viz., cyan, magenta, and yellow.

U.S. Pat. No. 5,067,829 proposes to steer light beams by passing the light beams through optically transparent elastic material which are bent under the application of a voltage which bending or deformation causes the change in the angle at which the light beam intercepts the surfaces of the optically transparent layers.

U.S. Pat. No. 5,052,777 utilizes a bimorph as a shutter to pass or block light coupling therethrough. Such bimorph shutters permit light, such as transmitted through optical fibers, to be coupled through the bimorph light valves to an observer for generating graphic displays.

U.S. Pat. No. 4,274,101 discloses a laser recorder that utilizes a piezoelectric bimorph focal length vibrator.

U.S. Pat. No. 5,126,836 proposes a television display wherein a white light source emits a beam onto a plurality of dichroic mirrors which split the beam into three beams of primary colors, then reflects the primary beams onto three deformable reflective surfaces which may be piezoelectric crystals, which again reflect the beams through slits in a non-reflective surface, thereby modulating the intensity of the beams. U.S. Pat. No. 4,415,228 also proposes a bimorph light valve, as does U.S. Pat. No. 4,234,245.

Additional proposals include Stein, et al, "A Display Based on Switchable Zero Order Diffraction Grating Light Valves", *Advances in Display Technology V*, SPI vol. 526, 105–112 (1985), which propose a flat panel display which utilizes a matrix of line addressable light valves back-lighted with a partially collimated source. The basic pixel element of the display is an optical switch based on the zero order of diffraction by two aligned transmission phase gratings. The transmission of light is modulated by mechanically displacing one grating with respect to the other by one-half of the grating. A bimorph is used for this purpose.

Finally, another proposal is by Gale, et al., "Diffractive Diffusers for Display Application", *Current Developments in Optical Engineering and Diffraction Phenomena*, SPIE vol. 679, 165–168 (1986), which propose diffractive optical diffusers for display applications wherein the diffusers can be fabricated by laser beam writing techniques.

The foregoing techniques function to some degree to provide graphic displays; however, a much improved technique for creating such displays is disclosed in U.S. Patent No. 5,613,022, by Odhner, et al., entitled "Diffractive Display and Method Utilizing Reflective or Transmissive Light Yielding Single Pixel Full Color Capability," issued Mar. 18, 1997. Through movement of a diffraction grating, this technique can be used to create graphic displays, each pixel of the display being capable of full color. A diffuser panel or image surface can be illuminated by the pixel for enhancing viewing of the display by an observer.

While this diffractive technique represents an advancement in the field of graphics displays, there still exists a real need in the art for additional ways to implement this approach in order to make such diffractive displays economical and practical, especially when produced in large volume.

BROAD STATEMENT OF THE INVENTION

The present invention is directed to an improvement in a diffractive display suitable for presenting graphic and the like displays. Broadly, a novel embodiment is realized from a holographic diffraction pattern carried by a magnet or element and an electrically energizable coil magnetically coupled with said magnet, which is energizable for movement of the magnet. Rotation of the holographic diffraction pattern generates a display using the diffracted light from the holographic diffraction grating.

Another novel embodiment is realized from a faceted rotatable element (FRE) having an array of facets each bearing a diffraction grating and a source energizable for rotation of the FRE from a resting station to a viewing station. Rotation of the FRE generates a display using the diffracted light from the diffraction gratings.

One configuration for the FRE is a substantially flat, circular plate having a plurality of posts about its periphery each of which bears a diffraction grating. Alternately and preferably, however, any array of diffraction gratings each having a different spacing, preferably in the form of holographic diffraction gratings, may be disposed along the surface of the plate. Other configurations may be utilized which, because of their reduced mass, increase rotation speed and decrease acceleration and deceleration periods to enable each pixel to alternate between or among colors rapidly. Rotation of the FRE may be realized through the use of, for example, a stepper motor or linear actuator.

BRIEF DESCRIPTION OF THE DRAWINGS

For a fuller understanding of the precepts and advantages of the present invention, reference is made to the description that follows taken in conjunction with the accompanying drawings in which.

The drawings will be described in detail below.

DETAILED DESCRIPTION OF THE INVENTION

A unique method for creating graphics displays is disclosed in U.S. Pat. No. 5,613,022, by Odhner, et al., entitled "Diffractive Display and Method Utilizing Reflective or Transmissive Light Yielding Single Pixel Full Color Capability," issued Mar. 18, 1997 (hereinafter referred to as "the '022 patent"). Using this technique, a diffraction grating, carried by an electroactive or magnetoactive film, is connected to an energy source that is energizable for movement of the film. The diffraction grating will diffract a particular color when illuminated by a broad band source at a particular angle. Movement of the film carrying the diffraction pattern will change the angle of incident light to the diffraction grating. This will cause the beam diffracted at a given angle to change its wavelength. For a broad band visible light source (although the present invention is equally applicable to ultraviolet (or UV) and infrared wavelengths of energy), it is possible to cause a pixel to reflect the colors, inter alia, red, green, and blue, as a function of the rotation of the diffraction grating.

In order to achieve color uniformity and a wide field of view, this grating should be a hologram of, e.g., ground glass, photographic film, or the like. The diffracted color is determined by the grating equation:

$$\lambda = d(\sin \iota + \sin \delta)$$

where, $\lambda$ = wavelength of diffracted light (microns)
$d$ = grating spacing of one cycle (microns)
$\iota$ = angle of incidence from plate normal (degrees)
$\delta$ = angle of diffraction from plate normal (degrees)

For a fixed $\delta$ and a fixed d, the wavelength will vary with changes in $\iota$.

A number of implementations to effect movement of the diffraction grating are disclosed in the '022 patent. One embodiment involves the application of a voltage to a piezoelectric material to which a diffraction grating is attached causing the material to bend varying the effective spacing of the diffraction grating. The deflection of the film being proportional to the voltage applied. Other embodiments employ magnets and energizable coils to provide deflection of a diffraction grating according to the principles of electromagnetics. Each of the specifically described variations of the magnetic approach in the '022 patent includes fixed permanent magnets and a rotatable coil to which a diffraction grating is affixed. Interaction of the permanent magnets' fields and the magnetic field generated by the coil provide the force that causes the coil, and thus the diffraction grating, to rotate.

While the embodiments disclosed in the '022 patent may be produced satisfactorily for most commercial purposes, the art always strives to develop improvements which are more practical and efficient. In testing an embodiment using a fixed coil and a moving magnetic component to which a diffraction grating is attached, unexpected results were achieved. It is expected that providing a fixed coil and moving magnet, instead of a fixed magnet and moving coil, would result in equivalent performance. However, using the moving magnet approach unexpected and beneficial results were realized including smaller mass relative to torque produced and less power dissipation, less hinge material variance in spring constant and conductivity, fewer production quality control issues, and lower production process costs.

Figure 1:
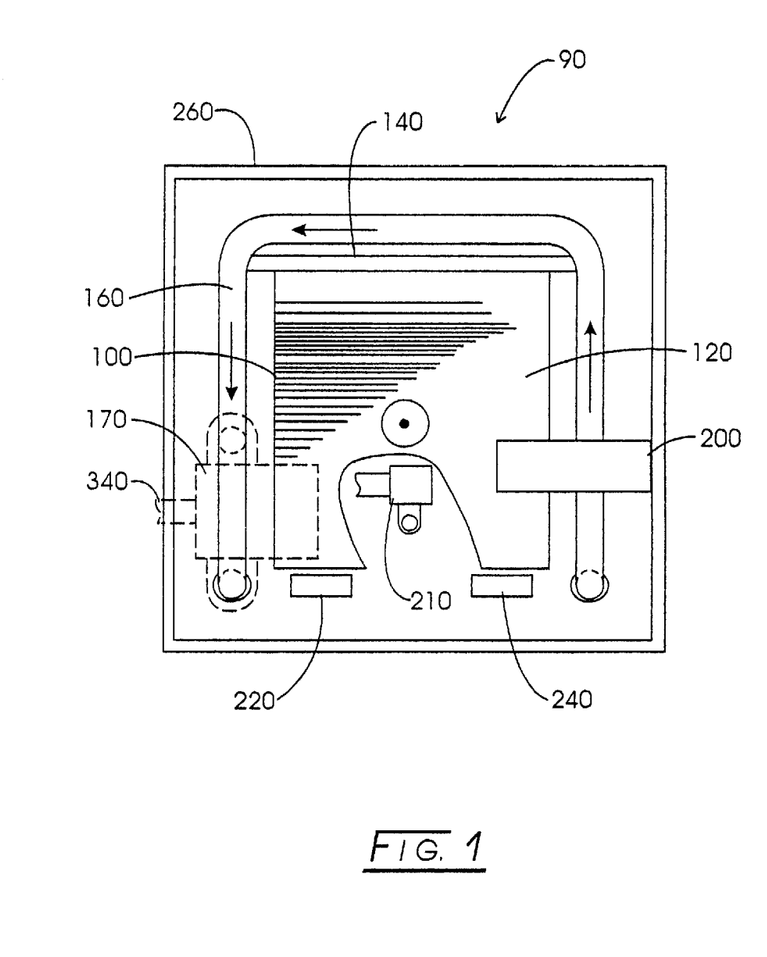
FIG. 1 is a top view of a pixel utilizing the improved rotating magnet and fixed, energizable coil embodiment.

Looking now to FIG. 1, a top view of a pixel, shown generally at 90, is revealed to include the improved moving magnet embodiment. A diffraction grating is provided at 100. This diffraction grating may be a holographic film. Diffractive grating 100 is attached to a magnetic component that is a permanent magnet (shown at 120 in FIGS. 2 and 3). Diffractive grating 100 may be physically attached to magnet 120 or, alternatively, diffractive grating 100 and magnet 120 each may be affixed to an additional element to form the attachment. Magnet 120 rests upon pivot 140 which is made of ferromagnetic material and, therefore, attracts magnet 120 and holds it in place while still allowing the tilting motion to take place about pivot 140. Connecting to, part of, or adjacent to, pivot 140 is current carrying conductor 160 that is connected to FET (field effect transistor) 170. As such, magnet 120 and coil 160 are magnetically coupled.

With current flowing through wire 160, a magnetic field is created which exerts a force on magnet 120. Because magnet 120 is not in a permanently fixed position, the force created by the current in wire 160 will cause magnet 120, and associated diffractive grating 100, to rotate about pivot 140. The direction of rotation of magnet 120, and associated diffractive grating, about pivot 140 depends on the direction of the magnetic field associated with magnet 120 and the direction of current flowing through wire 160. Reversing the polarity of the current in wire 160 changes the direction of the force created, causing the magnet to rotate in the opposite direction. Wire 160 may consist of multiple turns, however, for efficiency purposes, the coil preferably consists of a single turn. Electromagnetic shielding 260 is provided around each pixel to prevent the interaction of fields generated by neighboring pixels or external sources (so-called "cross-talk"). This shielding may be composed, for example, of SAE 1010 steel. As will be obvious to one skilled in the art, alternative configurations can be envisioned to electromagnetically couple magnet 120 and coil 160 for movement of the magnet. Several illustrative configurations are described in greater detail later.

Figure 2A:
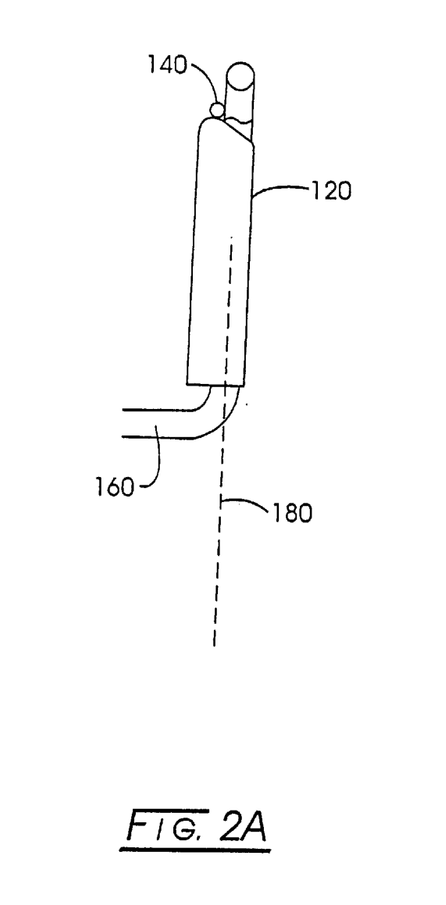
FIGS. 2A–2C illustrate the rotation of a magnet from an initial position to two different positions.
Figure 2B:
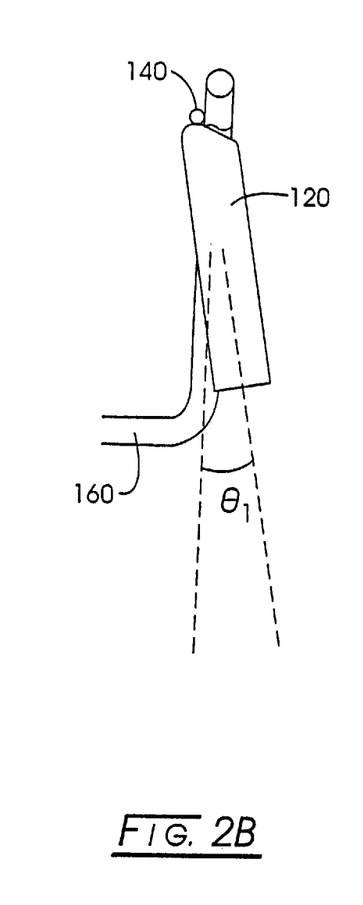
Figure 2C:
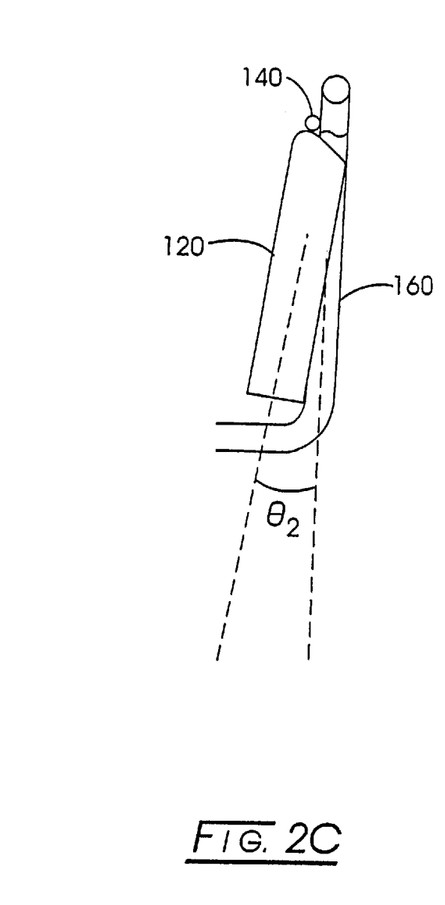

Turning briefly to FIGS. 2A–2C, magnet 120 is shown rotated to two different positions. Numeration contained in FIG. 1 is retained. In FIG. 2A, magnet 120 is in an initial position normal to pivot 140, as indicated by the dashed line 180. When current flows through wire 160 in the direction indicated in FIG. 1, magnet 120 will be rotated from its initial position through an angle, $\theta_1$, to the position shown in FIG. 2B. By reversing the polarity of the current flowing through wire 160, magnet 120 will be rotated through an angle, $\theta_2$, in the opposite direction as shown in FIG. 2C. Generally, the magnet will need to rotate only about 8 degrees in either direction to achieve a full color pixel.

Returning to FIG. 1, stops 200 and 210 prevent the rotation of magnet 120 beyond desired bounds. A portion of magnet 120 has been cut away to reveal the presence of stop 210. Stop 210 may include a capacitance probe or sensor which senses the presence of a capacitor (not shown), for example, composed of aluminized Mylar®, which is located below magnet 120 and indicates the position of magnet 120. Once the magnet has been driven to a desired position, it is held in place by the magnetic fields surrounding ferromagnetic pins 220 and 240. Because of the presence of these pins, magnet 120 may be held in position with little or no current flowing in wire 160.

Figure 3:
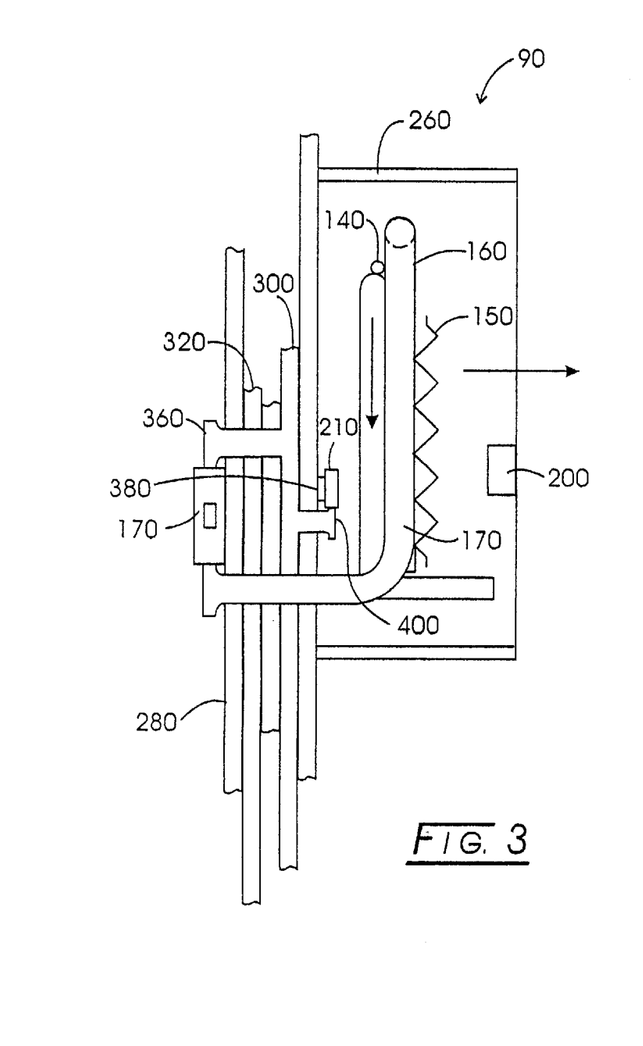
FIG. 3 is a side view of the pixel of FIG. 1 which shows the connection of a magnet and coil to a printed circuit board.

Turning now to FIG. 3, a side view of the pixel of FIG. 1 is shown revealing the connection of the above-described elements to a printed circuit board. Numeration from FIG. 1 is retained. Printed circuit board (PCB) 280 is seen to have ground plane 300 and +voltage bus 320. FET 170 is connected in series with conductor 160, ground connector 360 and +voltage connector 340 (FIG. 1) being connected to ground plane 300 and +voltage bus, respectively. Similarly, the capacitance sensor located on stop 210 is connected to ground plane 300 at 400 and +voltage bus 320 at 380. The connection of elements to PCB 280 is intended to be illustrative and not limiting of the present invention, as it will be obvious to those skilled in the art that other arrangements may be provided.

Figure 4A:
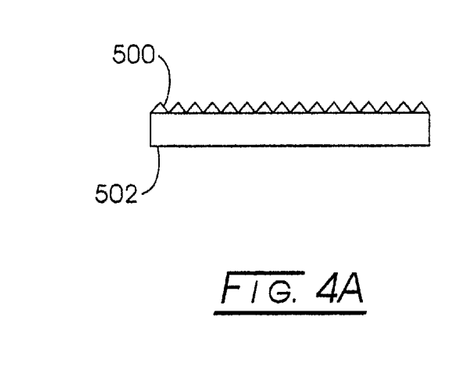
FIGS. 4A–4E show a number of methods for attaching a magnet and diffractive grating.
Figure 4B:
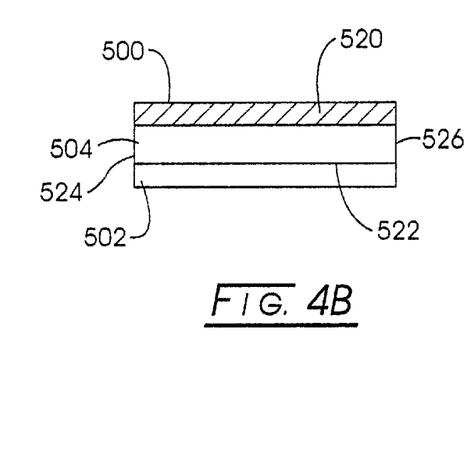

Turning to FIGS. 4A–4F, alternate configurations of the magnetic component are revealed. FIG. 4A shows the configuration utilized in FIG. 1 wherein diffraction grating 500 is affixed directly to permanent magnet 502. For fabrication purposes, carrier 504 may be interposed between magnet 502 and diffraction grating 500 as shown in FIG. 4B.

Figure 4C:
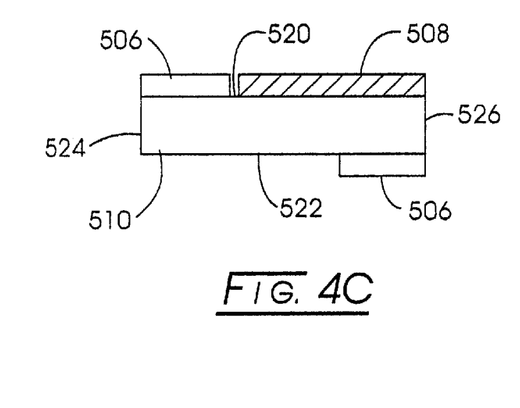
Figure 4D:
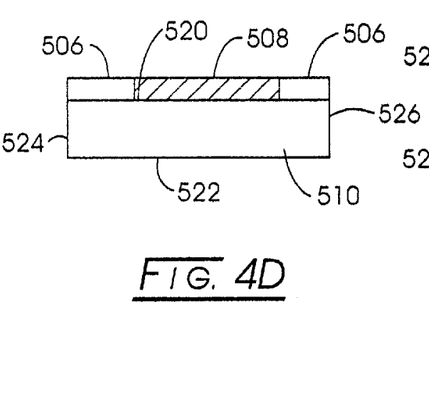
Figure 4E:
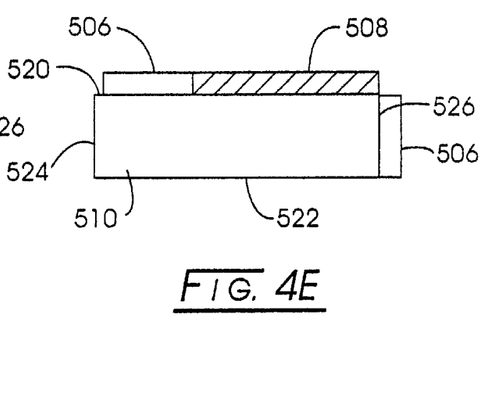
Figure 4F:
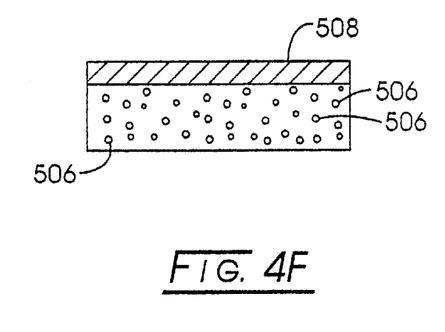

For the two previous magnet configurations, a single magnet is provided whose dimensions extend co-extensively with those of the supported diffraction grating and carrier, if a carrier is included. A magnet having lesser dimensions also may be used. In addition, where multiple coils are provided, other configurations are possible using multiple permanent magnets located in various positions relative to the diffraction grating. The magnetic component also could be provided in the form of discrete magnetic particles dispersed or embedded in any desired concentration throughout the carrier. For illustrative purposes, several possible magnet configurations are shown in FIGS. 4C–4E. In each of these figures, the reference number 506 indicates a permanent magnet, while reference numerals 508 and 510, respectively, indicate the presence of a diffraction grating and a carrier. Carrier 510 is shown in these figures as having a rectangular shape with upper surface 520, lower surface 522, front edge 524, and rear edge 526. The description of carrier 510 as being rectangular, however, is intended in an illustrative and not a limiting sense as the geometry of carrier 510 may be varied. With multiple magnets and multiple coils, the interaction of the resulting magnetic fields may be different from that described with respect to FIG. 1; therefore, some modification of the system may be required. However, with the appropriate modification, unique configurations may be designed by one skilled in the art which, while mimicking the electromagnetic technique shown in FIG. 1, take advantage of extra driving forces to achieve special effects.

In the course of developing the moving magnet embodiment based on the electromagnetic concepts disclosed in the '022 patent, it was discovered that the unique use of diffraction gratings to create graphic displays could be implemented in a slightly different fashion. While this implementation is an approximation of the '022 approach, significant structural advantages may be realized. These advantages may be actualized through the utilization of a faceted rotatable element (FRE) designed to diffract one of a select number of colors to an observer when illuminated by a broad band source at a particular angle. A facet, provided on a rotatable base or element, is a region or area having a diffraction grating with a particular grating spacing which, when illuminated by a broadband light source, diffracts a particular color to an observer. An array of facets may be achieved on the FRE by providing an array of diffraction gratings each of which may have a different spacing wherein each diffraction grating element of the array may be disposed in juxtaposition or may be spaced apart, or by using a holographic diffraction grating array wherein the array of facets are superimposed. In its simplest embodiment, however, the FRE may have a single diffraction grating disposed upon its surface, each change in position of the FRE representing a facet. Those skilled in the art will appreciate that there is any number of practical methods for implementing the FRE approach. The rotating element may be, for example, a plate having a surface and a periphery, which is connected to an energy source such as a linear actuator or stepper motor, which effects rotation of the plate. A single diffraction grating or an array of diffraction gratings, each element of such array having a different grating spacing or a superimposed array of holographic diffraction gratings, may be disposed along the surface of the plate; or alternatively, posts, each of which supports a diffraction grating, may be located about the periphery of the plate. A select number of the conceivable FRE configurations are described in greater detail in the following figures. These too are intended as illustrative and not limiting of the present invention.

While the facets may be randomly placed along or across the FRE, the location of each facet within the array is known. For example, each location can be stored in the memory of a microprocessor. With the location of each facet in the array known, the FRE may be rotated such that the light source illuminates a select facet to diffract a particular color of interest.

Figures 5, 6A, 8A, 8B:
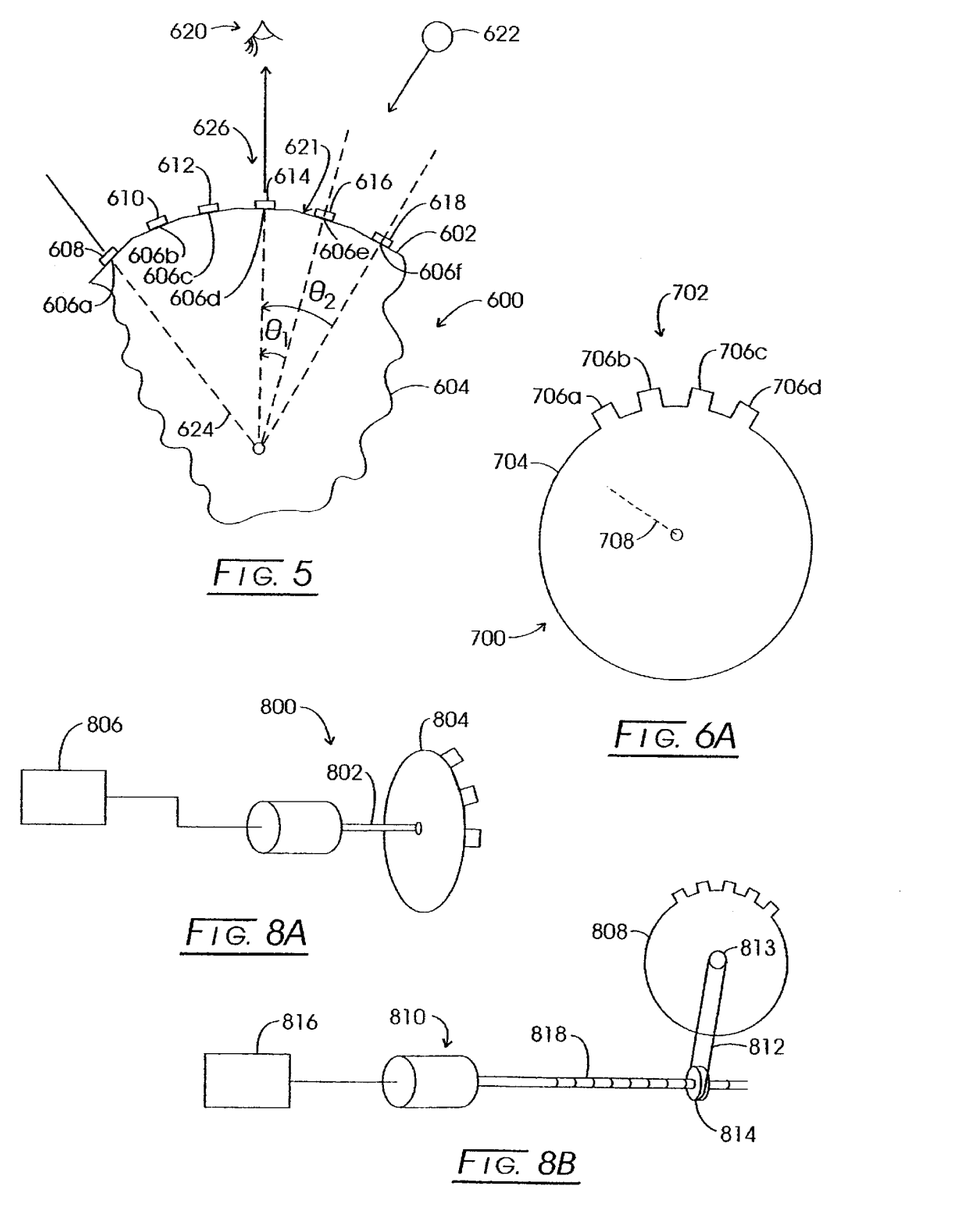
FIG. 5 illustrates a partial view of light being diffracted from a source to an eye station by a faceted rotating element (FRE)
FIGS. 6A–6E shows a number of FRE configurations each composed of a support portion and a faceted surface portion.
FIG. 8A is a perspective view of an FRE connected to a stepper motor.
FIGS. 8B and 8C are perspective views of an FRE connected to a linear actuator.

Turning to FIG. 5, an FRE having an array of facets in the form of posts extending around its periphery, is shown illuminated by a broad band source. The FRE, shown generally at numeral 600, is seen to have surface portion 602 and support portion 604. Surface portion 602 is composed of an array of facets 606a–606f, each of which bears a diffraction grating. These gratings diffract light from broad band source 622. The lengthwise extent of each facet extends greater than that of the supported diffraction grating, such that an amount of space or a rest station, such as that shown generally at 621, is created between adjacent diffraction gratings. Each rest station may represent a null position or may be used to provide a background color when an image is not being displayed. Each of diffraction gratings 608, 610, 612, 614, 616, and 618 has a unique grating spacing to diffract a particular color as seen by the viewer at eye station 620. FRE 600 is rotatable about an axis normal to the surface of support portion 604 which may be at its center of gravity, at an edge, at its center, or in any other desired position. The location of the axis of rotation, such as that shown at 624, will in part depend on the geometry and construction of support portion 604. Rotation of FRE 600 may be in either a clockwise or counterclockwise direction; however, rotation in either direction about an origin provides the greatest efficiency.

FRE 600 initially is positioned at a rest station. From this initial rest station position, FRE 600 is rotated to a viewing station wherein a diffraction grating is located at origin 626. In FIG. 5, diffraction grating 614 is located at origin 626 so that diffracted light of a particular color will be seen at eye station 620. This light, for example, may be blue. To diffract a different color to eye station 620, FRE 600 is rotated from one viewing station past a resting station to another viewing station. Because each diffraction grating has a unique grating spacing, incident light from source 622 will be diffracted at a different angle associated with a particular color. Light diffracted from grating 616 carried by facet 606e may be green, while the light diffracted by grating 618 carried by facet 606f may be red. The relative positioning of the facets with respect to origin 626 30 determines the angle of rotation associated with each. To view green light at eye station 620, FRE 600 is rotated as indicated by angle $\theta_1$. To view red light at eye station 620, FRE is rotated as indicated by angle $\theta_2$, and so on. The number of discrete colors available to generate a graphics display is determined by the number of facets and associated diffraction gratings provided along the surface portion of the FRE.

Figure 6B:
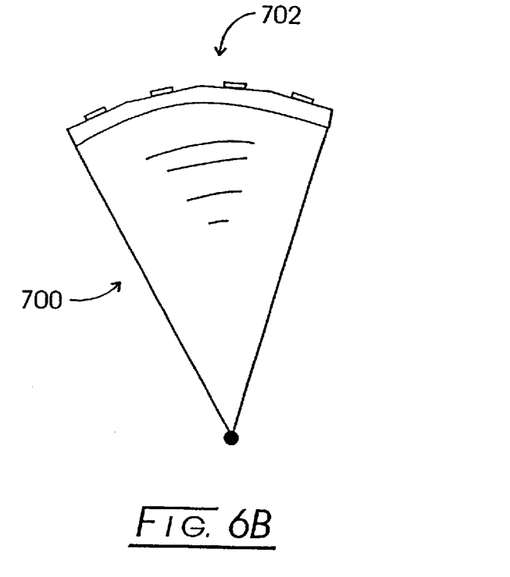

As illustrated in FIGS. 6A–6E, variations of the support portion and faceted surface portion may be utilized to create an FRE suited to any particular display application. In FIGS. 6A–6E, a support portion and surface portion are shown generally at numerals 700 and 702, respectively. FIG. 6A depicts substantially flat, circular plate 704 having facets in the form of posts 706a–706d, which extend from its outer periphery. A diffraction grating, for example formed from a photoresist (holographic diffraction grating), is carried on the outer end of each post 706a–706d. Using a circular plate such as that at numeral 704, the axis of rotation is most practically located through the plate's center identified by numeral 708. Alternately, only a part of the circle may be provided as the support portion, as shown in FIG. 6B, with a faceted surface portion extending around its outer periphery. With this less massive configuration, the FRE may be rotated more quickly with less power required to commence and terminate rotation from one diffraction grating to another. For this configuration, the center of gravity is likely the most efficient location for the axis of rotation. Given the more rapid rotation to a desired viewing station and more efficient performance which may be obtained by reducing the mass of the FRE, it will be obvious to one skilled in the art that any number of configurations may be provided for this purpose. Similarly, the number of posts, or the number of diffraction gratings located on each post, may vary in accordance with the display purpose.

Figure 6C:
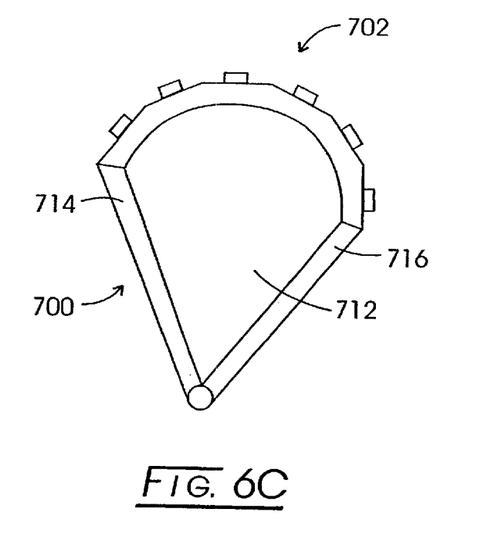
Figure 6D:
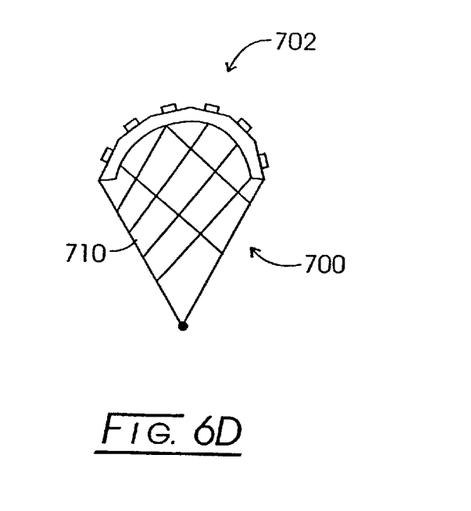
Figure 6E:
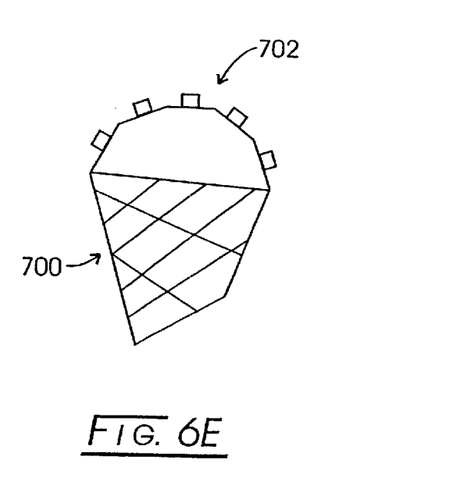

As another alternate, the FRE could have a lattice or grid-like mesh support portion as shown at numeral 710 in FIG. 6C. The support portion also may have an open center as at 712, the surface portion being supported at its ends by support rods as at numerals 714 and 716. While the support portion of the FRE has been described as being circular or a section of a circle, FIG. 6E reveals a support potion having an angular geometry. The support portion may be designed in any configuration that may be rotated about an axis and that is capable of supporting a faceted surface portion. The support portion, shown generally at numeral 700 in FIGS. 6B–6E, may support a faceted surface portion such as that shown in FIG. 5 or may have facets comprising posts as in FIG. 6A.

Figure 7:
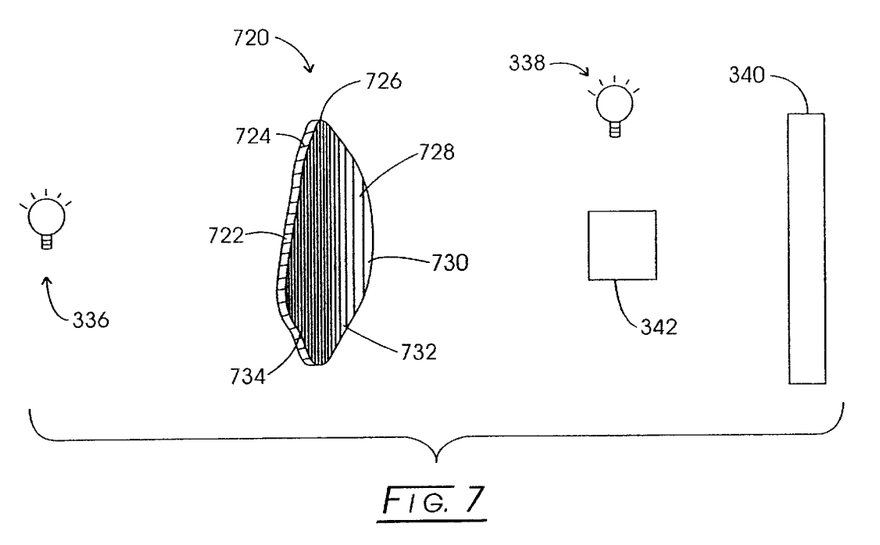
FIG. 7 is a perspective view of an FRE in combination with several conventional display elements.

Turning now to FIG. 7, an FRE is revealed in combination with several conventional display elements. The FRE, represented generally at numeral 720 is composed of generally circular plate 722 with periphery 724 and surface 726. While the FRE shown is shown and described as having a generally circular shape, other shapes may be proposed to suit differing display designs. The shape of the rotating element also may be chosen to maximize pixel density. A continuous diffraction grating is disposed along surface 726. Diffraction grating 728 has three facets 730, 732 and 734 each of which is associated with a particular color as seen by an observer. By rotating one of the facets to a viewing station, in similar fashion as that described above in connection with FIG. 5, light from a broad band source will be diffracted to an eye station where a viewer will see the selected color. It is readily apparent that multiple facets disposed along the plate surface also may be provided by a plurality of diffraction gratings. In addition, for efficiency purposes, a particular color may be repeated by placing more than one diffraction grating with associated grating along the plate surface. Multiple areas of a single color may minimize the response time required to rotate the plate to a viewing station where the desired color is displayed.

While the array of facets may be provided as a plurality of posts along the periphery of the plate or as an array of diffraction gratings each element of the array having a different grating spacing, another approach is to superimpose the facets holographically. The array of facets is superimposed on a single photographic film, each facet being angularly oriented or offset with respect to each other. Thus, the holographic film is developed such that at a given position of FRE 720 with respect to the light source, a particular color is transmitted to the observer or to a detector. For example, the colors red, blue, and green may be reconstructed by a single holographic element or pixel. If plate 722 is rotated, for example, 2° from an initial position of 0°, incident light is diffracted and the color blue will be seen transmitted to the observer. By rotating plate 722 to another position, for example, 9° from its initial position, the observer will see the color green. Then, if the plate is rotated, for example, 17° from the initial position, the color red will be transmitted to the observer. Additional colors (wavelengths of energy, both visible, IR, and UV) may be generated by holographically superimposing a greater number of facets of different select diffraction grating spacing on the surface of the plate. Similarly, additional colors (wavelengths of energy) may be achieved by oscillating plate 722 between two diffraction gratings, or colors, at a given frequency such that observer perceives a third color.

Figure 9A:
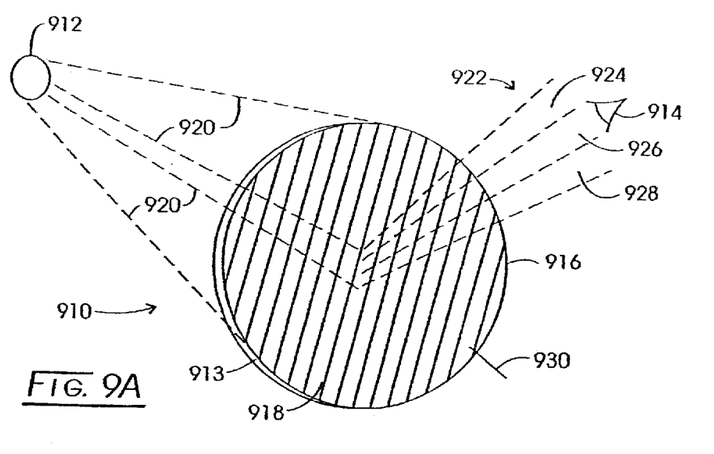
FIG. 9A is a perspective view of an FRE having a single diffraction grating.
Figure 9B:
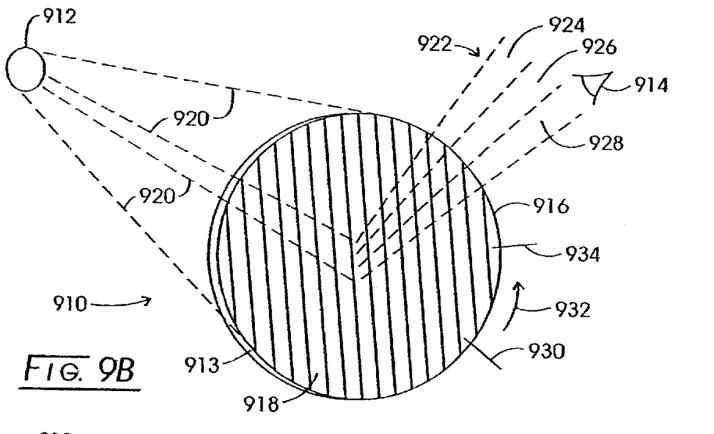
FIG. 9B is a perspective view of the FRE of FIG. 9A being rotated from an initial position to a second position.
Figure 9C:
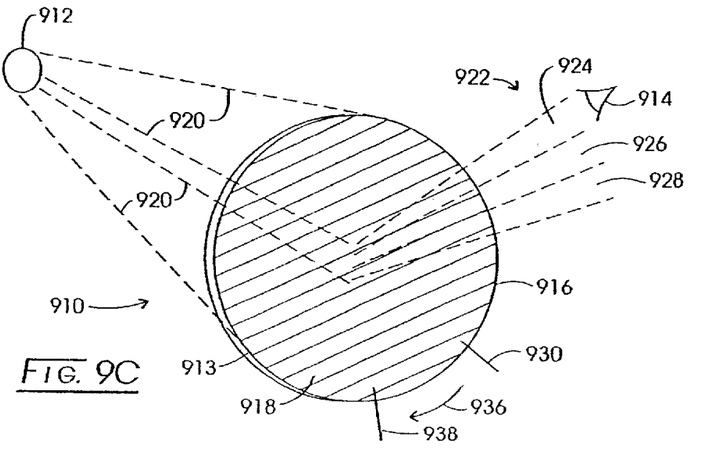
FIG. 9C is a perspective view of the FRE of FIG. 9A being rotated from an initial position to a third position.

As described in connection with FIGS. 5 and 6, the array of facets supported by an FRE is provided by a plurality of diffraction gratings. In its simplest form, however, an FRE with its array of facets may be a single diffraction grating. In FIGS. 9A–C, such an FRE is illustrated. Looking first to FIG. 9A, an FRE having the above-described configuration is shown generally at 910 in combination with a broad band light source, 912. FRE 910 is fixed relative to light source 912 as shown in FIGS. 9A–9C. At a fixed location relative to FRE 910 is an eye station, 914. When a select facet of FRE 910 is at a viewing station, a select color generated by FRE 910 is seen by an observer at eye station 914. By rotating the facets between a resting station and a viewing station, i.e. by rotating FRE 910, individual colors are selectively displayed at eye station 914.

To generate these different select colors or energies, FRE 910 is composed of a plate or disk, 913, and a single holographic diffraction grating, 916, which has a constant grating spacing, 918. Diffraction grating 916 is seen to be disposed across the surface of disk 913. Preferably, diffraction grating 916 is a holographic diffraction grating. White light, as shown at 920, is generated by source 912 and, when incident on the surface of FRE 910, a spectrum or plurality of colors is generated by grating 916, as shown generally at 922. For illustrative purposes, spectrum 922 is seen to include three colors, 924, 926, and 928. In fact, spectrum 922 will include a multitude of colors. What range of the spectrum will be diffracted and the width of each color band will be determined by grating spacing 918.

While a plurality of colors are generated by grating 916 in conventional fashion, an observer at eye station 914 sees only one color at a time. For example, in FIG. 9A, FRE 910 is revealed in an initial position as indicated by line 920. At this initial position, the color seen by observer 914 will, for example, be green. By rotating FRE from its initial position to a second position, as shown in FIG. 9B, a second color will be seen at eye station 914. If FRE 910 is rotated 7° from its initial position, for example, as indicated by arrow 932 extending between lines 930 and 934, spectrum 922 shifts such that color 928 is seen at 914. This color, for example, may be red. As illustrated in FIG. 9C, FRE 910 may be rotated to display a third color, for example being rotated 8° in the opposite direction, as indicated by arrow 936 extending between initial position 930 and third position 938. This third color, for example, may be blue.

Each rotational position of FRE 910 represents a facet, a select color being diffracted to an observer at eye station 914 for each position. As with the previous embodiments, when a facet is in a position to display color to the observer, that facet is at a viewing station. When a facet is not in a position to display color to the observer, then that facet is at a resting station. Thus, in FIG. 9A the facet associated with the color green is at a viewing station. The other two facets of FRE 910, i.e. those associated with the colors red and blue, each being at a resting station. In FIG. 9B, the facet associated with the color red is at a viewing station, while in FIG. 9C, the facet at the viewing station is the one associated with the color blue.

If the observer is properly positioned, as at 914 in FIGS. 9A–C, all of the colors that the FRE is capable of generating may be selectively displayed. That physical location, at which all of the colors are separately viewable, will vary in size depending on the width of each color band. As mentioned previously, the grating spacing of the diffraction grating will determine the range of the spectrum diffracted and the width of each color band. The greater the number of colors generated, and thus the narrower the band of each color, the smaller the physical area where the observer can be positioned to view all of the colors. For example, if an FRE such as that shown and described in connection with FIGS. 9A–C, is rotated too far from its initial position in either direction, no color will be seen by observer 914.

Figure 8C:
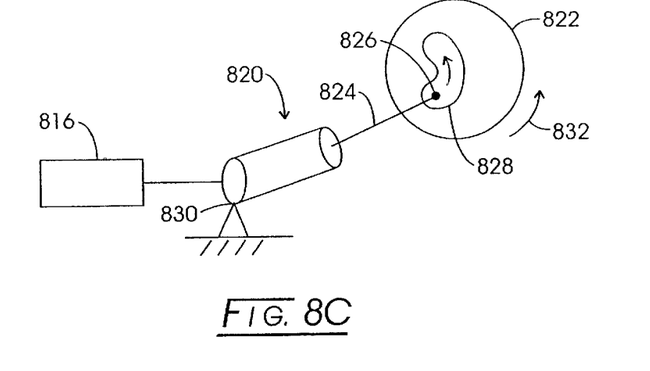

Looking briefly at FIGS. 8A–8C, several mechanisms suitable to rotate the FRE are shown. FIG. 8A reveals an FRE, such as that described in connection with FIG. 6A, connected to a stepper motor. The stepper motor, shown generally at numeral 800, has spindle 802 that is connected to center of circular plate 804. Microprocessor driven controller 806 effectuates rotation of spindle 802 and associated plate 804 in predetermined steps in a clockwise and/or counterclockwise direction. With each step, the plate may be rotated from a resting station to a viewing station or from one viewing station to another with the plate passing through a resting station. The resolution of the stepper motor must be at least equal to the number of diffraction gratings supported by the faceted surface portion. Using an FRE with a stepper motor eliminates the need for position sensors, such as those used with the moving magnet embodiment. The microprocessor can store information about the FRE's position by tracking the number of steps rotated in each direction. In addition to a stepper motor, any motive source capable of translating linear motion to rotational motion also may be used.

In FIG. 8B, plate 808 is shown connected to linear actuator 810. Like the stepper motor, linear actuator 810 is controlled by microprocessor 816. Linear motion of rod 818 is converted to rotational motion in conventional fashion, for example, by pulley 812 connected between axle 813, about which the plate is rotated, and nut 814. Another conventional method for translating linear motion to rotary motion, illustrated in FIG. 8C, is achieved by connecting linear actuator 820 to plate 822 having arc accommodation. To effect rotational movement, rod 824 of linear actuator 820 is connected to plate 822 by pin 826 within slot 828. Pivoting the linear actuator about point 830 while moving pin 826 within slot 828, the plate will rotate as shown by directional arrow 832. If the slot is of sufficient dimensions, the linear actuator may be fixed at point 830. Other methods for effecting rotational movement of the FRE, either of circular or of other shape, will be obvious to those skilled in the art.

Returning to FIG. 7, once an image has been generated as described above, conventional elements may be utilized to create graphic displays and the like. With the FRE formed of transparent material, a light source may be positioned behind the FRE, as shown generally at 336, to create a transmissive display. Alternatively, if FRE 720 is made of reflective material, a light source may be positioned as shown generally at 338 to create a reflective display. Creating both transmissive and reflective displays is discussed in greater detail in the '022 patent. For either type of display, the image generated using FRE 720 may be focused directly onto a diffusing element, such as shown at 340, by a lens assembly (not shown). Relatively little space is required between these elements allowing the construction of thin displays. To produce a larger image, a greater amount of space between these elements allows projection equipment, such as that shown at 342, to be interposed. Such projection equipment is well known in the art and easily incorporated into a display utilizing the unique image generation techniques.

The disclosure herein is illustrative of the present invention that should be understood to include various variations, modifications, and equivalents to those disclosed herein as those skilled in the art will appreciate. In this application, all references are incorporated herein by reference.

We claim:

1. In an apparatus comprising an element which carries diffraction grating(s) which element is associated with a source energizable for movement of said element, wherein said diffraction grating(s) are moved by movement of said element and wherein movement of said diffraction grating(s) diffract energy incident on said diffraction grating(s) to generate different select diffracted energies from said diffraction grating(s), the improvement which comprises:

said element being a faceted rotatable element (FRE) having an array of facets each facet of said array bearing a diffraction grating, and said FRE having a pivot point;

said source being fixed relative to said FRE and energizable to cause a select facet of said array to be rotated, by rotation of said FRE about said pivot point, from a facet resting station to a facet viewing station, whereat any said select diffracted energy(s) can be generated and displayed to an observer located at a stationary position with respect to said FRE, and only said select diffracted energy(s) will be displayed to said observer at said stationary position with respect to said FRE.

2. The apparatus of claim 1, wherein said source is a stepper motor.

3. The apparatus of claim 1, wherein the diffraction grating(s) are holographic diffraction grating(s).

4. The apparatus of claim 1, wherein said select diffracted energies are projected by a projection system.

5. The apparatus of claim 1, wherein said FRE is rotated about its center.

6. The apparatus of claim 1, wherein said FRE is rotated about its center of gravity.

7. The apparatus of claim 1, further including an image surface spaced apart from said FRE upon which said select diffracted energy(s) is focused to create a display.

8. In a method for generating different select diffracted energies from an element which carries diffraction grating(s) which element is associated with a source energizable for movement of said element, wherein said diffraction grating(s) are moved by movement of said element and wherein movement of said diffraction grating(s) diffracts energy incident on said diffraction grating(s) to generate different select diffracted energies from said diffraction grating(s), the improvement which comprises the steps of:

(a) providing said element as a faceted rotatable element (FRE) having an array of facets each bearing a diffraction grating, and said FRE having a pivot point;

(b) fixing said source relative to said FRE; and (c) energizing said source to cause a select facet of said array to rotate, by rotation of said FRE about said pivot point, from a facet resting station to a facet viewing station, whereat any said select diffracted energy(s) can be generated for displaying to an observer located at a stationary position with respect to said FRE, and only said select diffracted energy(s) will be displayed to said observer at said stationary position with respect to said FRE.

9. The method of claim 8, which further comprises the step of providing said source as a stepper motor.

10. The method of claim 8, which further comprises the step of providing said diffraction grating(s) as holographic diffraction grating(s).

11. The method of claim 8, which further comprises the step of projecting with a projection system said generated different select diffracted energies onto a surface.

12. The method of claim 8, which further comprises the steps:

(d) providing an image surface spaced apart from said FRE; and (e) focusing said generated select diffracted energy(s) onto said image surface to create a display.

13. The apparatus of claim 1, wherein said FRE is a plate having a surface which bears a holographic diffraction grating of constant spacing and said plate having an axis, said FRE being rotatable about said axis to a plurality of facet viewing stations to create said array of facets, such that at each facet viewing station a select diffracted energy(s) is generated and displayed to said observer.

14. The method of claim 8, which further comprises the steps of:

providing said FRE as a plate having a surface which bears a holographic diffraction grating of constant spacing and said plate having an axis, said FRE being rotatable about said axis to a plurality of facet viewing stations to create said array of facets, such that at each facet viewing station a select diffracted energy(s) is generated and displayed to said observer.

* * * * *